(12) United States Patent
Ehrne et al.

(10) Patent No.: US 7,011,294 B1
(45) Date of Patent: Mar. 14, 2006

(54) VACUUM VALVE (75) Inventors: Florian Ehrne, Feldkirch (AT); Christof Bachmann, Sennwald (CH); Friedrich Geiser, Nueziders (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 10/936,163

(22) Filed: Sep. 8, 2004

(51) Int. Cl.
*F16K 3/00* (2006.01)

(52) U.S. Cl. ...................... 251/328; 251/333

(58) Field of Classification Search ........ 251/326–328, 251/332–334
See application file for complete search history.

(56) References Cited

U.S. PATENT DOCUMENTS

| | | | |
|---|---|---|---|
| 2,194,261 A | | 3/1940 | Allen |
| 2,401,377 A | * | 6/1946 | Smith ........................ 251/327 |
| 2,815,187 A | * | 12/1957 | Hamer ....................... 251/328 |
| 3,425,662 A | * | 2/1969 | Bryant et al. ............... 251/176 |
| 3,575,431 A | * | 4/1971 | Bryant ....................... 277/641 |
| 3,722,852 A | | 3/1973 | Powell et al. |
| 3,996,750 A | * | 12/1976 | Brcar ......................... 405/104 |
| 4,548,386 A | | 10/1985 | Gladisch et al. |
| 4,921,213 A | | 5/1990 | Geiser |
| 5,013,009 A | | 5/1991 | Nelson |
| 6,367,770 B1 | | 4/2002 | Duelli |
| 6,629,682 B1 | | 10/2003 | Duelli |

* cited by examiner

*Primary Examiner*—J. Casimer Jacyna
(74) *Attorney, Agent, or Firm*—Reed Smith LLP (57) ABSTRACT

A vacuum valve comprises a valve housing with a valve opening having a longitudinal axis and a valve seat, a valve plate which is displaceable in a straight line in a displacement direction between an open position in which it releases the valve opening and a closed position in which its contacts the valve seat of the valve housing and closes and seals the valve opening, this valve plate being arranged on at least one valve rod which is displaceable axial to the displacement of the valve plate, a flexible sealing ring which is arranged at a front side of the valve plate or at the valve seat of the valve housing, a sealing surface which is arranged at the valve seat of the valve housing or at the front side of the valve plate and which is contacted by the sealing ring in the closed position of the valve plate, wherein the sealing surface and the sealing ring are arranged in parallel planes which are inclined relative to the displacement direction of the valve plate around an axis extending at right angles to the displacement direction and at right angles to the longitudinal axis of the valve opening, and at least one sliding-spacing part which is arranged at the front side of the valve plate next to the sealing ring or sealing surface or at the valve seat next to the sealing surface or sealing ring and which forms a sliding bearing for the valve plate relative to the valve housing when closing the valve along a final section of the displacement path of the valve plate until the closed position of the valve plate is reached and which keeps the valve plate at a distance from the valve housing in the closed position of the valve plate and accordingly limits the pressing of the sealing ring.

31 Claims, 8 Drawing Sheets

VACUUM VALVE

BACKGROUND OF THE INVENTION a) Field of the Invention

The invention is directed to a vacuum valve comprising a valve housing with a valve opening having a longitudinal axis and a valve seat, a valve plate which is displaceable in a straight line in a displacement direction between an open position in which it releases the valve opening and a closed position in which its contacts the valve seat of the valve housing and closes and seals the valve opening, this valve plate being arranged on at least one valve rod which is displaceable axial to the displacement of the valve plate, a flexible sealing ring which is arranged at a front side of the valve plate or at the valve seat of the valve housing, a sealing surface which is arranged at the valve seat of the valve housing or at the front side of the valve plate and which is contacted by the sealing ring in the closed position of the valve plate, wherein the sealing surface and the sealing ring are arranged in parallel planes which are inclined relative to the displacement direction around an axis extending at right angles to the displacement direction of the valve plate and at right angles to the longitudinal axis of the valve opening.

b) Description of the Related Art

Valves in which the sealing surface and the sealing ring lie in parallel planes that are inclined relative to the displacement direction of the valve plate around an axis extending at right angles to the longitudinal axis of the valve opening are known as wedge gate valves. Valves of this type are not normally used for vacuum applications but as fluid valves. A fluid valve of this kind is disclosed, for example, in U.S. Pat. No. 2,194,261. Other wedge gate valves are known, for example, from U.S. Pat. Nos. 4,548,386 and 5,013,009.

In vacuum valves with valve slides having elastomer seals, however, it is usually required when the valve plate is moved into its closed position to ensure that the seal is not loaded transverse to its longitudinal direction from the moment it contacts the sealing surface. A shear stress of this kind acting on the seal is generally considered very disadvantageous with respect to the life of the seal.

Therefore, in vacuum technology valve slide constructions are usually designed in such a way that the closing movement of the closure member is carried out at least substantially perpendicular to the sealing surface of the valve seat in the final segment of the closing movement.

In a first conventional embodiment form of a gate valve of the type mentioned above, the valve plate is initially displaced in a displacement direction by an actuating device for closing the valve until it is in a position that is located opposite from the valve opening but is raised from the valve seat. Subsequently, a movement is carried out perpendicular to the sealing surface, i.e., in direction of the longitudinal axis of the valve opening, so that the valve plate is moved toward the valve seat. The second step of the closing movement in gate valves of this kind is achieved in different ways, for example, by lever mechanisms, rolling bodies which are guided in wedge-shaped gaps between the valve plate and supporting plate, by tilting elements, and so on. In order to avoid bending the valve rod in the second step of the closing movement, a counter-plate is provided which is moved simultaneously toward a wall of the valve housing across from the valve seat. In another type of plate valve or slide valve, the second step of the closing movement is carried out in that the valve rod is swiveled around a fulcrum.

A gate valve or slide valve of the type mentioned above in which, in order to close the valve, the valve plate is initially displaced into a position that is located opposite from the valve seat but is raised from the valve seat and subsequently contacts the valve seat substantially perpendicular to the sealing surface is known, for example, from U.S. Pat. No. 6,629,682 B2. In order to protect the sealing ring from corrosive process gas acting on the material of the sealing ring in the closed state of the valve and to reduce the stress on the sealing ring in the closed state of the valve so that the sealing ring is less susceptible to the corrosive process gases, a supporting ring made of plastic is provided in this valve in addition to the sealing ring. This supporting ring lies closer to the valve opening than the sealing ring when viewed from the latter and limits the pressing force acting on the sealing ring in the closed state of the vacuum valve. Apart from a one-piece construction of the sealing ring and supporting ring, constructional variants in which a separate sealing ring and supporting ring are provided are also described.

U.S. Pat. No. 3,722,852 also discloses a sealing ring that is arranged perpendicularly against a seal and is supported by a supporting ring surrounding the sealing ring. It is also known to provide a circumferentially extending raised portion or projection at the valve plate, which projection is integral with the valve plate and contacts a surface surrounding the valve opening in the closed state of the valve so that the deformation of the sealing ring is limited.

In another type of plate valve or slide valve, the sealing surfaces and the surface at which the elastomer seal is arranged are constructed in a three-dimensional manner such that no shear stresses act on the elastomer seal when the valve plate moves into the valve seat in a straight line. The valve plate is displaced in a straight line along its entire displacement path between the open position and closed position. The forces act on the seal either substantially only in the direction perpendicular to the sealing surface or with an additional force component oriented in longitudinal direction of the seal. Accordingly, no shear forces act on the sealing ring. A vacuum valve of this kind is known, for example, from U.S. Pat. No. 4,921,213. In this valve, the sealing surface and the sealing ring do not lie in a plane and a portion of the sealing ring is arranged at a front end portion of the valve plate considered in the inward movement direction of the valve plate. This slide valve is disadvantageous in that sealing rings with relatively complicated shapes must be used; these sealing rings cannot be formed as O-rings inserted into a groove for larger nominal widths but must be vulcanized to the valve plate. Therefore, the entire valve plate must be exchanged when the sealing ring is damaged.

A vacuum valve of the type mentioned in the beginning is known from U.S. Pat. No. 6,367,770 B1. The valve plate has front and back sides that taper toward one another in the shape of a wedge, a circumferentially closed sealing ring being arranged respectively at these front and back sides. In order to prevent shear loads on the sealing rings to a great extent, the closing force that can be applied to the valve plate by the actuating member is only very small. When closing, the valve plate accordingly contacts the valve seat only slightly without substantial pressing of the sealing ring. Pressing of the sealing ring and a complete sealing of the valve are achieved only when a differential pressure is present between the sides of the valve and presses one of the two sealing rings against the sealing surface. However, a complete closing (i.e., sealing) of the valve is not possible without a differential force of this kind.

OBJECT AND SUMMARY OF THE INVENTION

An important object of the invention is to provide a vacuum valve which is constructed in a simple manner. Another object of the invention is to provide a vacuum valve in which only a straight-line displacement of the valve plate is required. Another object of the invention is to provide a vacuum valve which can be completely closed without any differential pressure being applied. Another object of the invention is to provide a vacuum valve in which the sealing ring can be exchanged in a simple manner and wherein the valve is suitable for small nominal widths as well as for large nominal widths.

A vacuum valve according to the invention comprises a valve housing with a valve opening having a longitudinal axis and a valve seat, a valve plate which is displaceable in a straight line in a displacement direction between an open position in which it releases the valve opening and a closed position in which its contacts the valve seat of the valve housing and closes and seals the valve opening, this valve plate being arranged on at least one valve rod which is displaceable axial to the displacement of the valve plate, a flexible sealing ring which is arranged at a front side of the valve plate or at the valve seat of the valve housing, a sealing surface which is arranged at the valve seat of the valve housing or at the front side of the valve plate and which is contacted by the sealing ring in the closed position of the valve plate, wherein the sealing surface and the sealing ring are arranged in parallel planes which are inclined relative to the displacement direction of the valve plate around an axis extending at right angles to the displacement direction and at right angles to the longitudinal axis of the valve opening, and at least one sliding-spacing part which is arranged at the front side of the valve plate next to the sealing ring or sealing surface or at the valve seat next to the sealing surface or sealing ring and which forms a sliding bearing for the valve plate relative to the housing when closing the valve along a final section of the displacement path of the valve plate until the closed position of the valve plate is reached and which keeps the valve plate at a distance from the valve housing in the closed position of the valve plate and accordingly limits the pressing of the sealing ring.

The invention is based on the insight that a wedge gate valve can advantageously be constructed as a vacuum valve by providing at least one sliding-spacing part which forms a sliding bearing for the valve plate relative to the valve housing when closing the valve along a final distance and which maintains the valve plate at a distance from the valve housing in the closed position of the valve plate and therefore limits the pressing of the sealing ring. Adequately low wear on the sealing ring and a sufficiently low level of particle generation when closing the valve are achieved in this way for many applications—excluding those in which the vacuum valve is opened and closed very frequently. In this regard, the final section of the closing movement in which the at least one sliding-spacing part slides at the valve housing can vary in length depending on the elasticity of the structural component parts, particularly the elasticity of the at least one sliding-spacing part and valve housing, and depending on the deviation of the valve plate from its central position.

In this respect, an O-ring which is inserted in a groove and can be exchanged in a simple manner is preferably used for the sealing ring. It is also conceivable and possible, although less preferable, to use a sealing ring that is vulcanized on.

The inclination of the planes of the sealing surface and sealing ring relative to the displacement direction of the valve plate ranges between 1° and 45° in particular. A value in the range between 4° and 10° is particularly preferred.

A valve according to the invention can be constructed in a simple and therefore economical manner overall. Simple maintenance is also possible. In a preferred embodiment form of the invention, there are at least two sliding-spacing parts which are spaced apart in circumferential direction of the sealing ring and sealing surface. These sliding-spacing parts each have a length that is substantially shorter than the circumferential length of the sealing ring. In this connection, it is advantageous when all of these sliding-spacing parts lie at a greater distance along their entire extension from an axis extending parallel to the displacement direction and running through the center of the valve plate or valve body and the valve opening than the sealing ring at its farthest point from this axis. Accordingly, no abrasion marks running along the sealing surface or sealing ring (when the valve plate deviates from its centered position) can occur as a result of the sliding-spacing parts when opening and closing the valve.

In an advantageous constructional variant, the sliding-spacing parts lock into recesses in the valve plate or valve housing by means of a locking connection and can accordingly also be exchanged in a simple manner.

Other advantages and details of the invention are described in the following with reference to the preferred embodiment example of the invention shown in the drawings, further objects of the invention following therefrom.

DESCRIPTION OF THE PREFERRED EMBODIMENTS

An embodiment example of a vacuum valve according to the invention is shown in FIGS. 1 to 13. The vacuum valve comprises a valve housing 1 with a valve opening 2 having a longitudinal axis 3. A valve plate 4 is mounted so as to be displaceable in a straight line (i.e., linearly) in the valve housing 1. To this end, the valve plate is arranged at a valve rod 5 which is displaceable in a straight line by an actuating device 6, shown only schematically, in direction of its longitudinal axis. The actuating device (actuator) 6 can be formed, for example, by a pneumatic piston-cylinder unit. Actuating devices having electric motors, for example, could also be used. Suitable actuating devices for axial displacement of the valve rod 5 are known and need not be described in detail within the scope of this application.

A movement of the valve rod 5 and of the valve plate 4 need only be carried out by the actuating device in one straight-line displacement direction 7. This displacement direction 7 is indicated, for example, in FIG. 3 by a double arrow.

A sealing ring 8 made of a flexible plastic (i.e., elastomer) is arranged at the valve plate 4. A suitable material for the sealing ring is Viton®, for example. A circumferential groove 9 is arranged in the valve plate 4 and the sealing ring 8, which is constructed in the form of an O-ring, is inserted into this circumferential groove 9. The side of the valve plate 4 on which the sealing ring 8 is arranged is referred to as the front of the valve plate 4 within the framework of the present application. The opposite side of the valve plate is referred to as its back. In a corresponding manner, the walls 10, 11 of the valve housing 1 located across from the front and back of the valve plate 4 are referred to as the front and back walls 10, 11.

The valve housing 1 encloses a chamber 12 in which the valve plate 4 is arranged. The chamber 12 is defined toward the front and the back by the walls 10, 11 and laterally by additional walls 13, 14. Openings which are flush with one another and which together form the valve opening are formed in the walls 10, 11. Further, flanges 15, 16 which are shown only schematically are arranged at the walls 10, 11 and the vacuum valve can be connected to other parts of the vacuum system, e.g., to a vacuum chamber or a pump, by these flanges 15, 16.

In the present embodiment example, the valve plate 4 is formed by a metal ring whose inner opening is closed by a thin plate 17. The valve plate 4 can also be solid and formed in one piece.

In the present embodiment example, the valve plate 4 is arranged at the valve rod 5 by means of a connecting screw 18 which penetrates an opening in the ring of the valve plate 4 and is screwed into an internal thread at the front end of the valve rod 5. A seal 44 (see FIG. 9) is arranged between the connection screw 18 and the valve plate 4 to seal the connection screw 18 relative to the valve plate 4. The valve rod 5 is guided out of the vacuum area. For this purpose, a bellows or diaphragm bellows is provided as a vacuum-tight linear feed-through and is connected in a vacuum-tight manner to the valve plate 4 at one of its ends by a seal 20 and, at its other end, is welded or soldered to a connection plate 21 which is connected in a vacuum-tight manner to a connection flange 23 of the valve housing 1 by a seal 22. For this purpose, screws 24 penetrate bore holes in a fastening plate 25 and in the connection plate 21 and are screwed into threaded bore holes of the connection flange 23, so that the connection plate 21 is pressed against the seal 22 that is inserted into a receiving groove of the connection flange 23. The seals 20, 22 and 44 are made of elastomer in the form of O-rings. Further, the actuating device 6 is fastened to the fastening plate 25.

The seals 20, 22 and 44 could also be constructed as metal seals.

The linear feed-through for the valve rod 5 can also be constructed in another way, for example, by means of one or more sealing rings which contact the outer circumference of the valve rod 5 in a sliding manner and which are mounted in corresponding receiving grooves of the valve housing. Linear feed-throughs are known in different embodiment forms.

Figure 1:
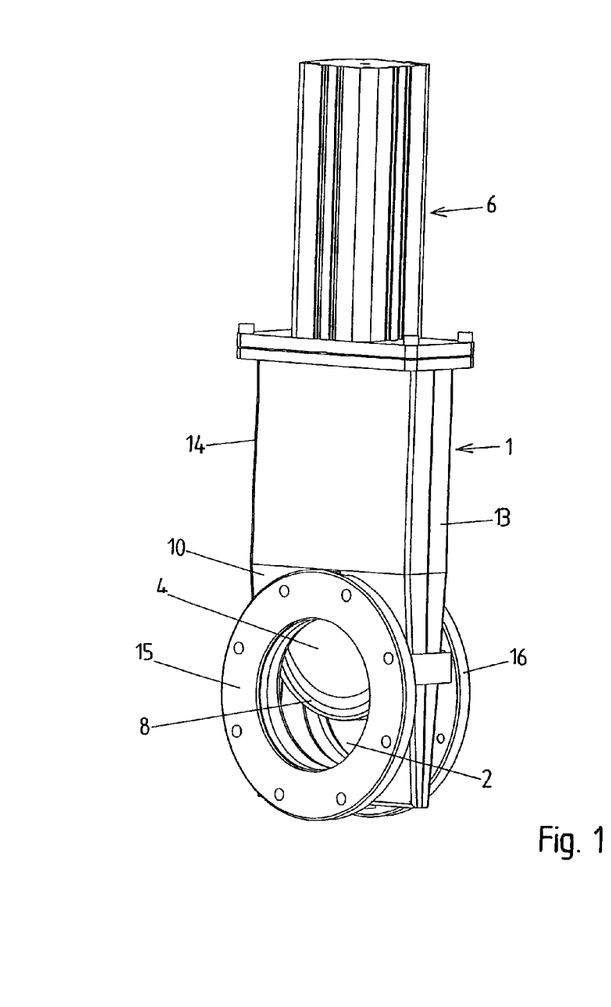
FIG. 1 is an oblique view of a vacuum valve according to the invention in the partially open state.
Figure 2:
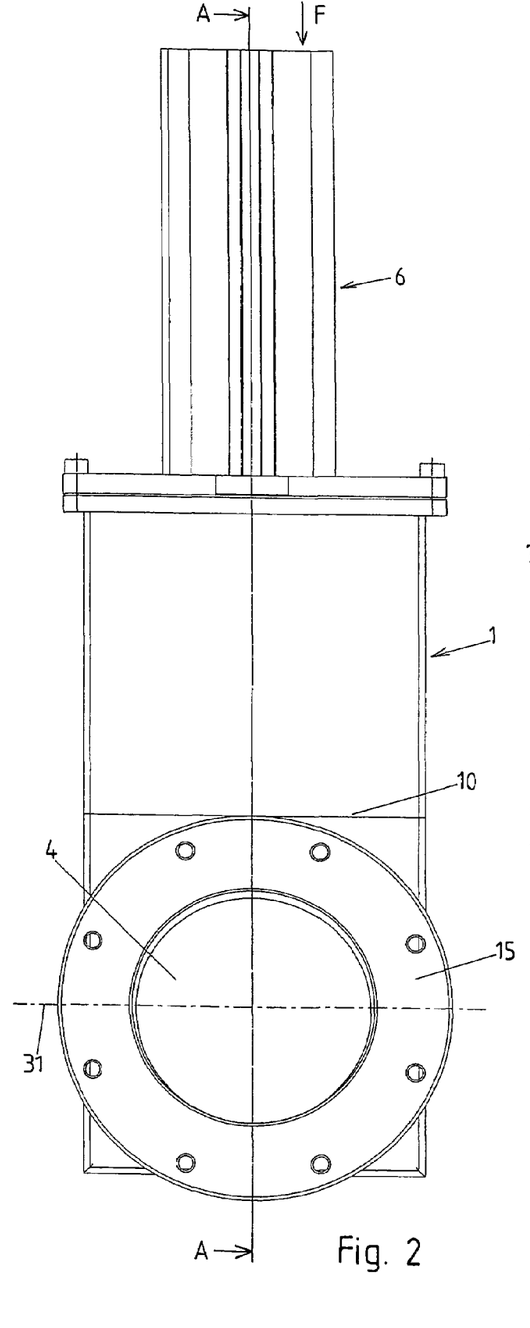
FIG. 2 is a front view of the vacuum valve in the closed state.
Figure 3:
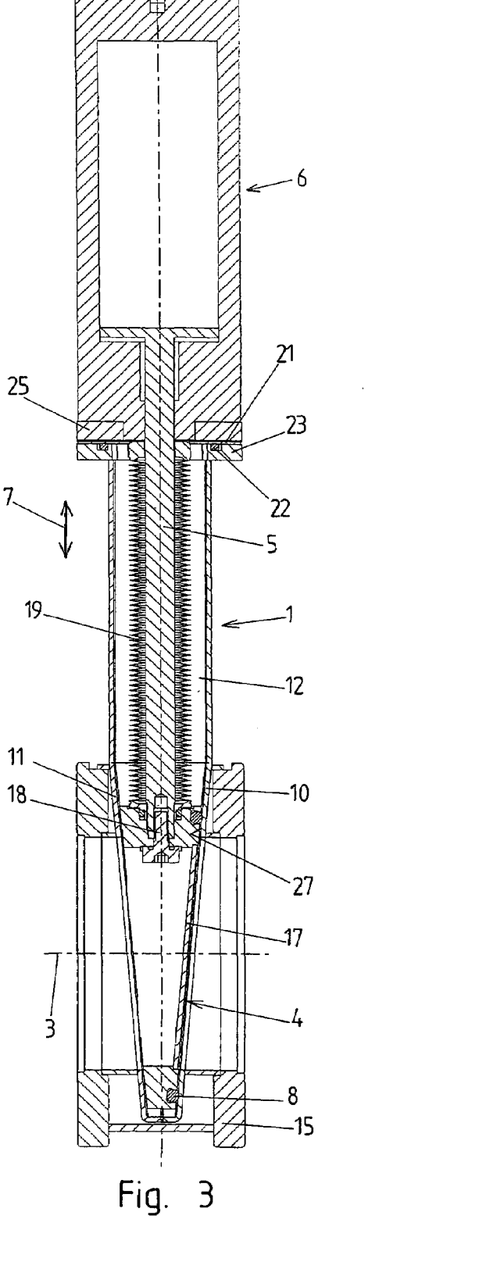
FIG. 3 shows a section along line A—A of FIG. 2.
Figure 4:
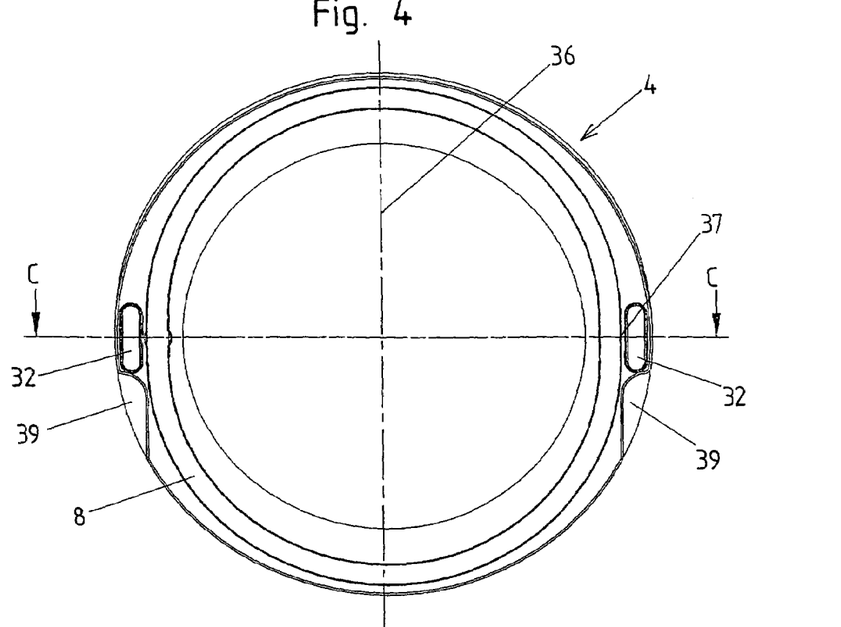
FIG. 4 is a front view of the valve plate.
Figure 5:
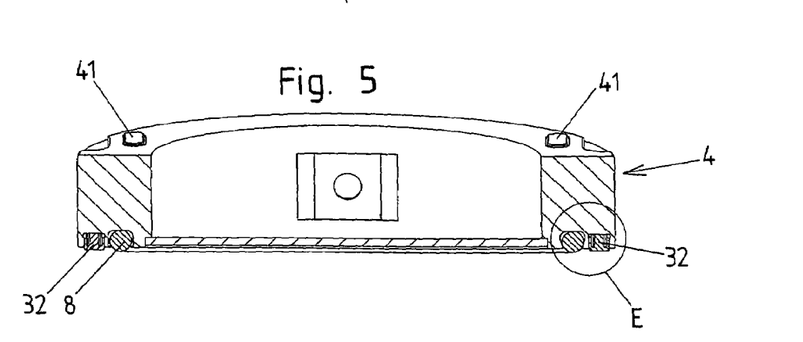
FIG. 5 shows a section along line C—C of FIG. 4.

FIG. 1 shows the vacuum valve in a partially open state. The valve plate can be drawn back farther in the direction of the actuating device 6 into the area of the chamber 12 of the valve housing remote of the valve opening 2 in order to assume its open state in which it fully releases the valve opening 2.

FIGS. 2, 3 and 11, 12 show the closed state of the valve in which the valve plate 4 is in its closed position. The valve plate 4 contacts a valve seat 26 of the valve housing 1 in its closed position. This valve seat 26 is formed by an area of the wall 10 surrounding the opening in the wall 10. A sealing surface 27 which is contacted by the sealing ring 8 in the closed position of the valve plate 4 is arranged at the valve seat 26.

Figure 13:
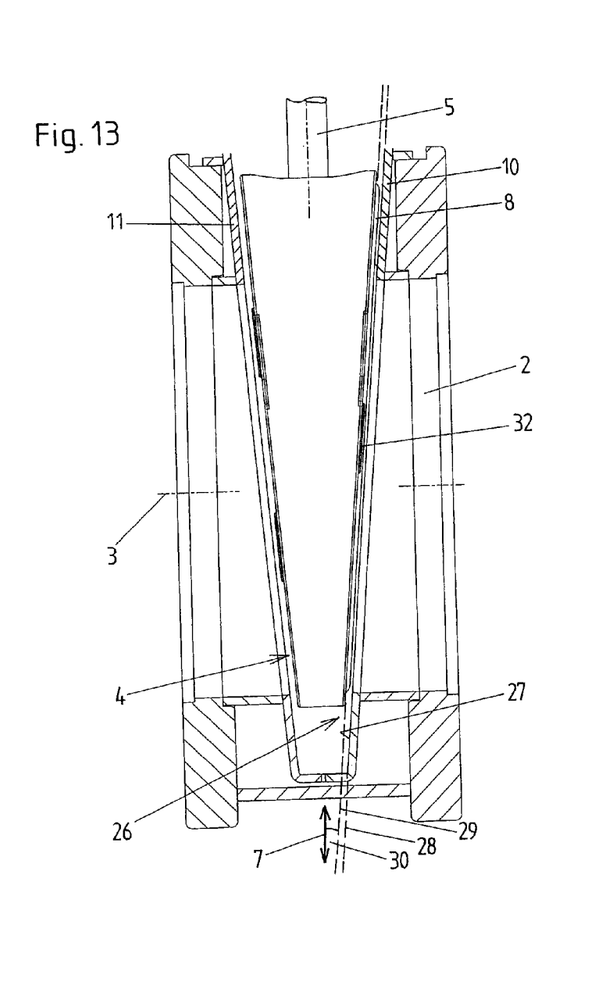
FIG. 13 is a side view showing a portion of the valve housing in a section along line A—A of FIG. 2 and of the valve disk that is located in a position in the vicinity of its closing position.

The sealing ring 8 and sealing surface 27 are arranged in parallel planes 28, 29 (see FIG. 13). These parallel planes 28, 29 are inclined or tilted at an angle 30 relative to the displacement direction 7. Each plane 28, 29 is inclined relative to the displacement direction around an axis 31, indicated in dashes in FIG. 2, which extends at right angles to the displacement direction 7 and at right angles to the longitudinal axis 3 of the valve opening. The inclination of the planes 28, 29 relative to the displacement direction 7, or angle 30, is in the range of 1° to 45°. A value ranging from 4° to 10° is particularly preferred.

In this sense, the vacuum valve can be called a wedge gate valve. The front of the valve plate 4 has the same inclination as the sealing ring 8, i.e., extends parallel to the planes 28, 29. In the present embodiment example, the back of the valve plate 4 and the wall 11 of the valve housing 1 located opposite from the back of the valve plate 4 are also inclined in opposite directions relative to the front of the valve plate 4 and relative to the wall 10 of the valve housing 1 having the sealing surface 27 (in each case around an axis parallel to axis 31). The angle can be in the range indicated for angle 30. The amount of the angle preferably corresponds to that of angle 30. Accordingly, when considered from the side (FIG. 13) or in the longitudinal center section corresponding to line A—A, the valve plate 4 and walls 10, 11 of the valve housing 1 present a wedge shape.

Sliding-spacing parts 32 are arranged at the front of the valve plate next to the sealing ring 8. In the open position of the valve plate, these sliding-spacing parts 32 do not project over the surface of the valve plate 4 as far as does the sealing ring 8 (see FIG. 6). This difference is designated by d in FIG. 6. In the embodiment example shown in the drawing, the sliding-spacing parts 32 are formed as insert parts which are separate from the valve plate 4 and which are inserted into groove-like recesses 33 in the valve plate 4 and fastened therein. The recesses 33 have offsets forming undercuts in their side walls, locking projections 34 of the sliding-spacing parts 32 engaging behind these undercuts. The sliding-spacing parts are provided with notches 35 proceeding from their base in order to provide elasticity for the locking projections 34. In this way, the sliding-spacing parts are locked into the recess 33 by means of a locking connection. It is also conceivable and possible for the sliding-spacing parts 32 to be connected to the valve plate 4 by other types of connections, e.g., screw connections.

Figure 6:
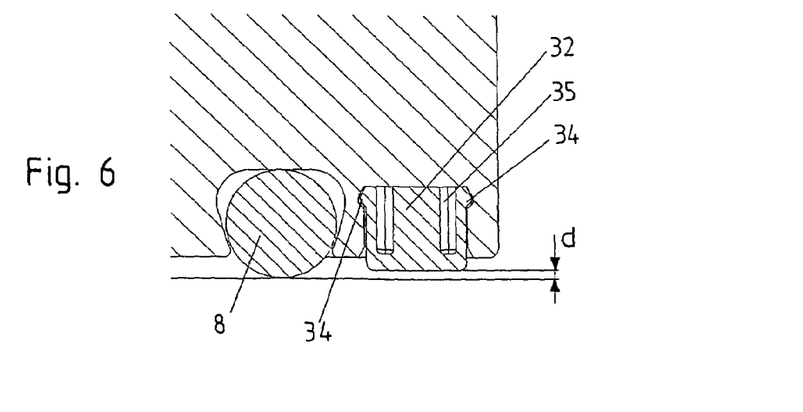
FIG. 6 shows a detail E from FIG. 5.
Figure 7:
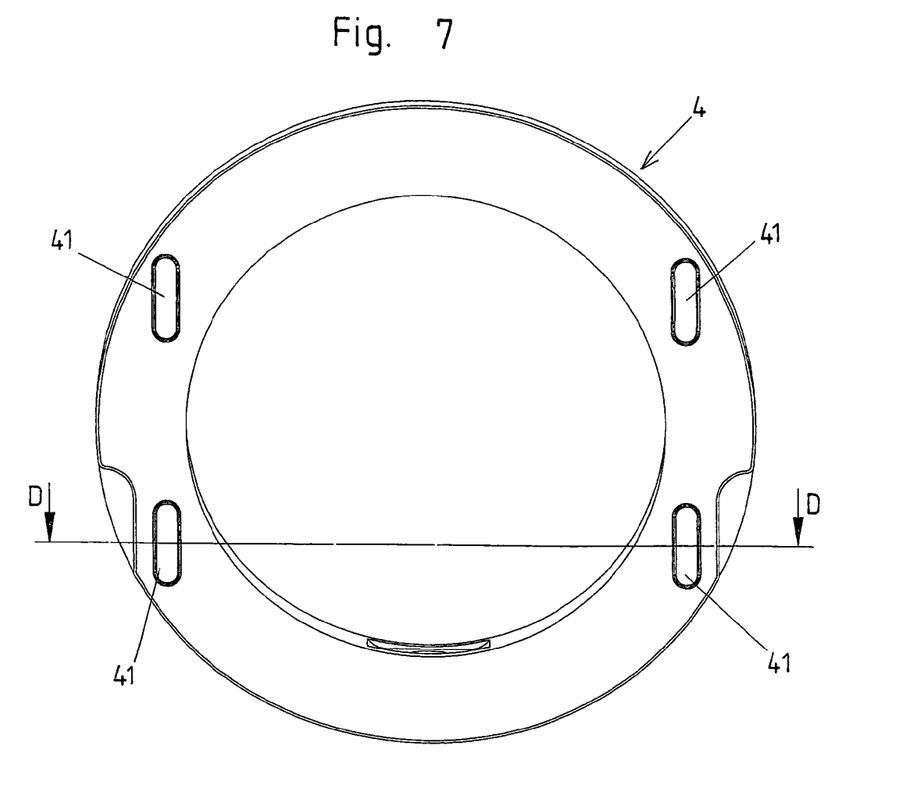
FIG. 7 is a rear view of the valve plate.
Figure 8:
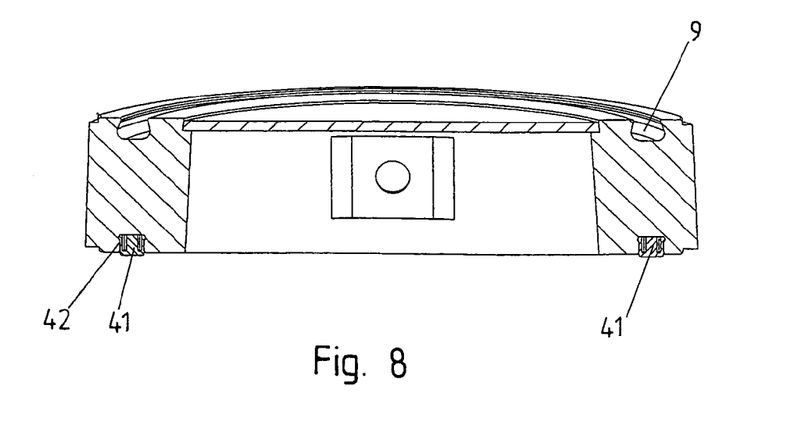
FIG. 8 shows a section along line D—D of FIG. 7.
Figure 9:
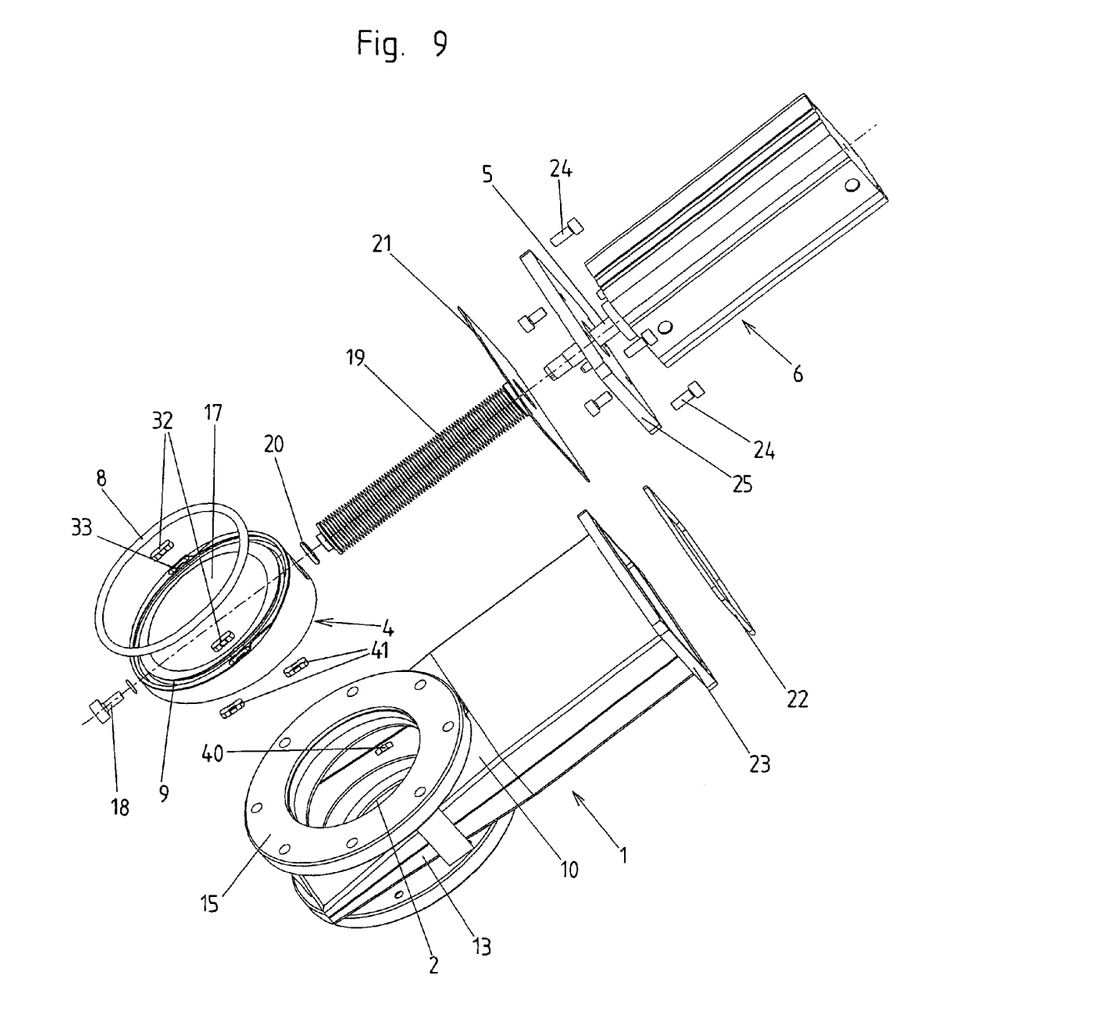
FIG. 9 is an oblique view of parts of the valve shown in a spread out state in the manner of an exploded diagram.
Figure 10:
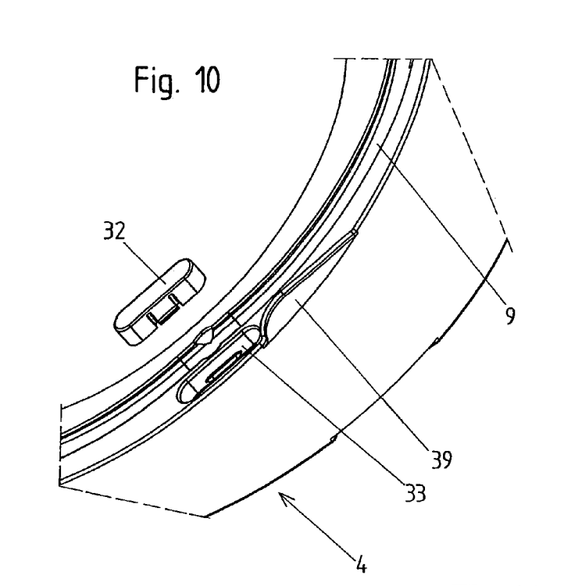
FIG. 10 is an enlarged view of a section of FIG. 9 in the area of the edge of the valve disk.
Figure 11:
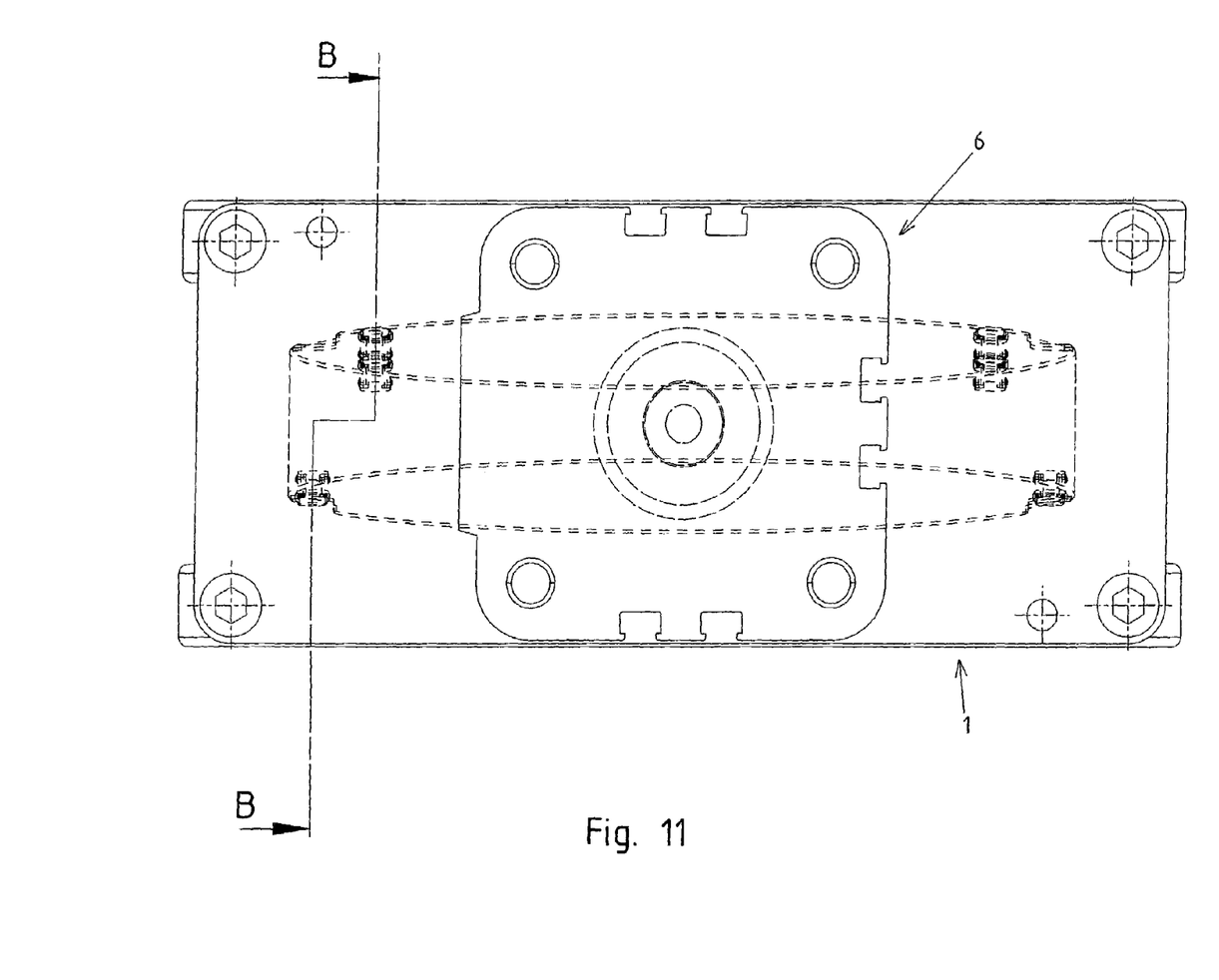
FIG. 11 is a top view of the vacuum valve (viewing direction F in FIG. 2), wherein the concealed lines of the valve disk are shown in dashes.
Figure 12:
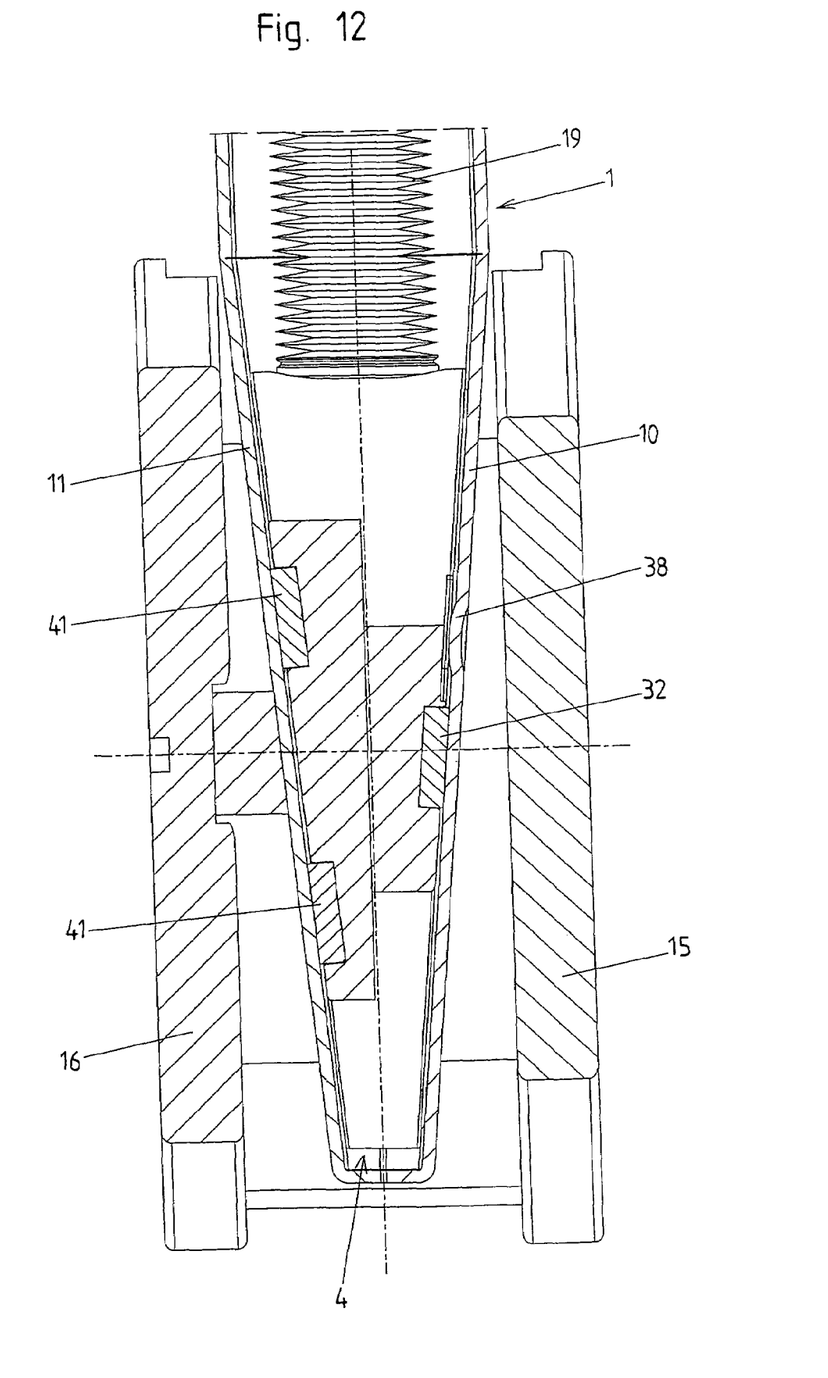
FIG. 12 shows a section along line B—B of FIG. 11.

When closing the valve, the sliding-spacing parts 32 form a sliding bearing for the valve plate 4 relative to the valve housing 1 along a final portion of the displacement path until the closed position of the valve plate is reached, wherein these sliding-spacing parts 32 can slide at an inner surface of the wall 10. In the closed position of the valve plate, the sliding-spacing parts 32 keep the valve plate 4 at a distance from the valve housing 1 through their contact at the wall 10. This limits the compression of the sealing ring 8 in the closed state of the valve plate 4. Since the sliding-spacing parts 32 are substantially inflexible in the direction perpendicular to the surface of the valve plate 4 so that their deformation in the closed position of the valve plate compared to their state in which they are not deformed is substantially less than the distance d, the sealing ring 8 is compressed substantially by a deformation path corresponding to distance d (FIG. 6).

In the embodiment example shown in the drawing, two sliding-spacing parts are arranged at opposite sides of the valve plate 4 and lie radially outside of the sealing ring. Along their entire extension, the sliding-spacing parts are at a greater distance from an axis 36 extending parallel to the displacement direction 7 and running centrally through the valve plate 4 considered from the front than the sealing ring 8 at its furthest point 37 from this axis 36 (see FIG. 4). This prevents abrasion marks on the sealing surface due to the sliding-spacing parts 32 since the possible areas of contact between the sliding-spacing parts and the wall 10 lie to the sides of the sealing surface 27.

Projections 38 are arranged at the inner surface of the wall 10 of the valve housing 1. These projections 38 lie in areas of the wall 10 over which the sliding-spacing parts 32 move before reaching the closed position. In the event that the valve plate 4 deviates from its centered position viewed in direction of the longitudinal axis 3 of the valve opening 2 when closing the valve and is displaced in direction of the wall 10 relative to this centered position, for example, when the valve is installed horizontally so that the front of the valve is directed downward, the sliding-spacing parts 32 can slide over the projections 38 when closing the valve. The valve plate 4 is accordingly at a distance from the wall 10 of the valve housing 1. This prevents the sealing ring 8 from running against the edge of the opening in the wall 10. The projections 38 have corresponding stop bevels against which the sliding-spacing parts 32 run. In the closed state of the valve, the projections 38 are received by recesses 39 at the front of the valve plate 4 that are arranged next to the sliding-spacing parts 32 viewed in the displacement direction 7.

Projections 40 whose construction is identical to that of the projections 38 are arranged at locations opposite from projections 38. Accordingly, a symmetric construction of the valve is provided so that the valve plate need not be carefully oriented in the valve housing when assembling the valve (both installation positions at 180° to one another are possible).

Sliding parts 41 are arranged at the back of the valve plate 4. These sliding parts 41, like the sliding-spacing parts 32, project over the surface of the valve plate 4 and when the valve is closed they form a sliding bearing for the valve plate 4 relative to the valve housing 1 along a final portion of the displacement path of the valve plate before reaching the closed position. The sliding parts 41 are preferably constructed so as to be identical to the sliding-spacing parts 32 and lock into recesses 42 at the back of the valve plate 4 which are identical to the recesses 39. In the embodiment example shown in the drawing, four sliding parts 41 are arranged in a symmetrical arrangement with respect to the axis 36 which extends parallel to the displacement direction and centrally through the valve plate 4. Its distance from the axis 36 is less than the distance of the sliding-spacing parts 32. Therefore, they do not move over the projections 40, but are guided past them, i.e., the projections 40 have no effect on the sliding parts 41.

Like the sliding-spacing parts 32, the sliding parts 41 preferably have a relatively low elasticity. The section over which the sliding-spacing parts 32 slide at the wall 10 and the sliding parts 41 slide at the inner surface of the wall 11 is determined by the given eccentricity on the one hand and by the existing elasticity and play of the parts on the other hand. These sections can also be very short, i.e., shorter than 3 mm.

The outer surface of the sliding-spacing parts 32 and/or of the sliding parts 41 by which they slide on the wall 10 and 11, respectively, preferably has good sliding properties. This sliding property can also be provided by the material of the sliding-spacing parts 32 and sliding parts 41 or by a corresponding sliding coating. The sliding-spacing parts 32 and/or sliding parts 41 preferably comprise a plastomer plastic with a relatively low elasticity, for example, a PEEKS® that is modified for sliding. It would also be conceivable and possible to use metal, particularly also with a sliding coating of plastic; Teflon, for example, would be suitable for this purpose.

The coefficient of friction $\mu$ of the sliding-spacing parts 32 and/or of the sliding parts 41 preferably lies in the range of 0.05 to 0.40.

The vacuum valve is closed proceeding from its open position through axial displacement of the valve rod 5 by means of the actuating device 6. Shortly before the valve plate 4 reaches its closed position, the sealing ring 8 initially contacts the sealing surface 27 and can slide along the latter as the valve plate 4 continues to close. Shortly thereafter, the sliding-spacing parts 32 and the sliding parts 41 contact the walls 10, 11, so that the valve plate 4 is centered and is moved into its closed position along a sliding guide. In the closed position, the pressing of the sealing ring 8 is limited to a predetermined value by the distance of the valve plate 4 from the valve housing 1 by means of the sliding-spacing parts 32.

As was described above, there are at least two sliding-spacing parts 32 whose length, in each instance, is substantially shorter than the circumferential length of the sealing ring 8. The length of the sliding-spacing parts 32 is preferably less than 1/10 of the length of the sealing ring 8. It would also be conceivable and possible, although less preferable, to provide only one individual sliding-spacing part which runs alongside the sealing ring around more than half of the circumference of the latter. An individual sliding-part 41 of this kind could also be provided.

In the embodiment example shown in the drawing, the sliding-spacing parts 32 are arranged at the valve plate 4. In principle, it would also be conceivable and possible to arrange these sliding-spacing parts 32 at the valve housing 1, so that they would contact the surface of the valve plate 4 in areas next to the sealing ring 8 when closing the valve. In this case, the projections 38 are arranged at the valve plate 4 and the recesses 39 receiving the projections 38 in the closed position of the valve plate are arranged at the valve housing 1.

The sliding parts 41 could also be arranged at the valve housing 1 so that they contact the surface of the back of the valve plate 4 when closing valve.

In the embodiment example shown in the drawing, the sealing ring 8 is arranged at the valve plate 4 and the associated sealing surface 27 is arranged at the valve seat 26 of the valve housing 1. Instead, the sealing ring could also be arranged at the valve seat and the sealing surface could be arranged at the valve plate. It would also be conceivable and possible to arrange the sliding-spacing parts at the valve plate as well as at the valve housing.

In the embodiment example shown in the drawing, the sliding-spacing parts 32 are separate parts that are fastened to the valve plate 4 (or to the valve housing 1). Instead of this, a one-piece construction with the valve plate 4 and the valve housing 1 would also be conceivable and possible, although this is not as preferable. The same applies for the sliding parts 41.

In the embodiment example shown in the drawing, the valve plate 4 is made of metal. It could also be made of plastic, e.g., PEEKS®, or a plastic coating would be conceivable and possible.

Figure 14:
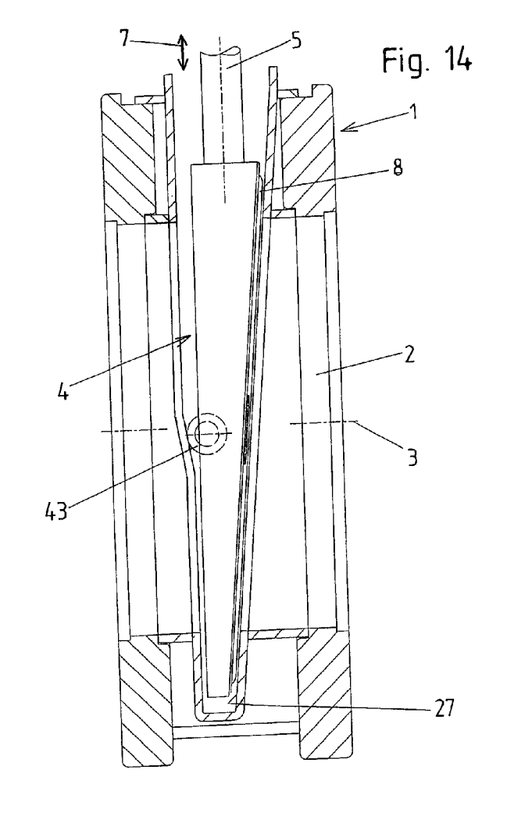
FIG. 14 shows a modified embodiment form of the invention in a view corresponding to FIG. 13.

A modified embodiment form of the invention is shown in FIG. 14. This embodiment form differs from the embodiment form according to FIGS. 1 to 13 in that no sliding parts 41 are arranged at the back of the valve plate 4 and in that this back also does not have a wedge shape. Rollers 43 are rotatably supported on the back of the valve plate 4. When closing the valve over a final stretch of the displacement path of the valve plate before reaching its closed position, these rollers 43 contact the wall 11 of the valve housing 1 and roll against the latter. In this area, the wall 11 has a portion extending diagonally in the direction of the wall 10. A roller 43 of this kind is rotatably supported at the valve plate 4 preferably on both sides of the valve opening 2.

Figures 15, 16:
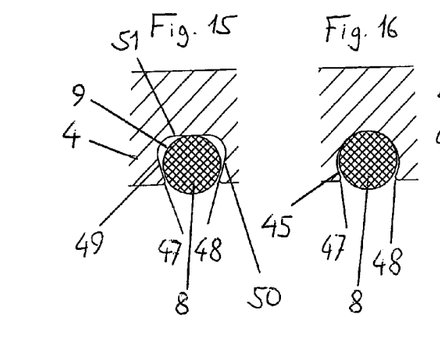
FIGS. 15, 16 and 17 show juxtaposed views of a preferred groove for the sealing ring (FIG. 15) and conventional grooves (FIGS. 16 and 17).
Figure 17:
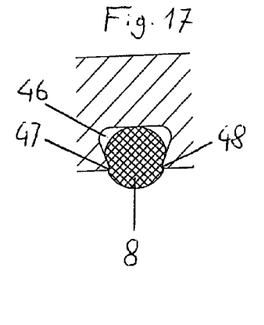

FIGS. 15, 16 and 17 show a juxtaposition of the groove 9 that is preferably used for the sealing ring 8 (FIG. 15) in a vacuum valve according to the invention compared to conventional known grooves 45, 46 (FIGS. 16 and 17). FIG. 17 shows a groove 46, commonly known as a dovetail groove, in cross section with a sealing ring 8 inserted therein. It will be seen that the sealing ring is squeezed at the outer defining edges 47, 48 of the groove. When the sealing ring 8 is rotated somewhat in the groove 46 by the action of shear forces when closing the valve, complete relaxation of the sealing ring 8 is no longer possible due to the squeezing between the defining edges 47, 48.

FIG. 16 shows a groove 45 for the sealing ring 8 in the form of a conventional circular groove which is formed in the shape of circle segments in cross section. The circle diameter is greater than the diameter of the sealing ring 8. The sealing ring 8 is accordingly free in the area of the outer defining edges 47, 48 and can accordingly be completely relaxed again when the valve is opened. However, this groove is disadvantageous in that the sealing ring 8 cannot be pressed into the groove completely; rather the groove 45 is already completely filled beforehand so that the sealing ring 8 is prevented from being pushed in farther. Therefore, when using a groove 45 of this type in connection with the invention, the various tolerances must be taken into account very exactly so that the sliding-spacing parts 32 can be effective.

In the groove, corresponding to FIG. 15, which is preferably used in connection with the invention, the sealing ring 8 has play relative to the outer defining edges 47, 48 in the relaxed state. When the sealing ring 8 is arranged so as to be centered in the groove 9, as is shown in FIG. 15, the side walls 49, 50 have a distance from the sealing ring 8 along their entire extension until the groove base 51, which distance is smallest in the vicinity of the outer defining edges 47, 48 and increases toward the base of the groove. When the groove is constructed in this way, the sealing ring 8 can be pressed into the groove 9 completely (so that it no longer projects over the outer surface of the valve plate 4). Further, the sealing ring 8 can relax again completely when the valve plate 4 is opened.

In addition to the advantages of the invention that were already mentioned, the invention also includes the following advantageous characteristics: metal-to-metal contact can be prevented, particularly relative movements of contacting metal parts. The surface of the parts located in the vacuum can be kept relatively small overall. The vacuum valve can be made resistant to differential pressure in both directions. The vacuum valve can be constructed so that it can open at full differential pressure of 1 bar. The vacuum valve is not limited to small nominal values and can, for example, also be constructed for nominal values of 400 mm and more.

The invention was described above with reference to valve plates which are circular in cross section. The invention can also be used for valve plates with different outer contours, for example, in valve plates which are square or rectangular viewed from the front. One or more valve rods 5 can be arranged at the valve plate. As follows from the preceding description, the field of the invention is not limited to the embodiment examples shown herein, but rather should be defined with reference to the appended claims together with their full range of possible equivalents.

While the preceding description and drawings show the invention, it is obvious to the person skilled in the art that various modifications can be carried out without departing from the spirit of and field of the invention.

REFERENCE NUMBERS

1 valve housing
2 valve opening
3 longitudinal axis
4 valve plate
5 valve rod
6 actuating device
7 displacement direction
8 sealing ring
9 groove
11 wall
11 wall
12 chamber
13 wall
14 wall
15 flange
16 flange
17 plate
18 connection screw
19 diaphragm bellows
20 seal
21 connection plate
22 seal
23 connection flange
24 screw
25 fastening plate
26 valve seat
27 sealing surface
28 plane
29 plane
30 angle
31 axis
32 sliding-spacing part
33 recess
34 locking projection
35 notch
36 axis 37 point
38 projection
39 recess
40 projection
41 sliding part
42 recess
43 roller
44 seal
45 groove
46 groove
47 outer defining edge
48 outer defining edge
49 side wall
50 side wall
51 groove base

What is claimed is:

1. A vacuum valve comprising:
a valve housing with a valve opening having a longitudinal axis and a valve seat;
a valve plate which is displaceable in a straight line in a displacement direction between an open position in which it releases the valve opening and a closed position in which it contacts the valve seat of the valve housing and closes and seals the valve opening;
said valve plate being arranged on at least one valve rod which is displaceable axial to the displacement of the valve plate;
a flexible sealing ring which is arranged at a front side of the valve plate or at the valve seat of the valve housing;
a sealing surface which is arranged at the valve seat of the valve housing or at the front side of the valve plate and which is contacted by the sealing ring in the closed position of the valve plate;
the sealing surface and the sealing ring being arranged in parallel planes which are inclined relative to the displacement direction of the valve plate around an axis extending at right angles to the displacement direction and at right angles to the longitudinal axis of the valve opening; and
at least one sliding-spacing part which is arranged at the front side of the valve plate next to the sealing ring or sealing surface or at the valve seat next to the sealing surface or sealing ring and which forms a sliding bearing for the valve plate relative to the valve housing when closing the valve along a final section of the displacement path of the valve plate until the closed position of the valve plate is reached and which keeps the valve plate at a distance from the valve housing in the closed position of the valve plate and accordingly limits the pressing of the sealing ring.

2. The vacuum valve according to claim 1, wherein there are at least two sliding-spacing parts at a distance from one another in circumferential direction of the sealing ring or sealing surface.

3. The vacuum valve according to claim 2, wherein the sliding-spacing parts have a length that is substantially shorter than the circumferential length of the sealing ring.

4. The vacuum valve according to claim 3, wherein the length of the sliding-spacing parts is less than 1/10 of the circumferential length of the sealing ring.

5. The vacuum valve according to claim 1, wherein the at least one sliding-spacing part is arranged in an area of the valve plate or valve seat lying radially outside of the sealing ring or sealing surface.

6. The vacuum valve according to claim 2, wherein the sliding-spacing parts lie at a greater distance along their entire extension from an axis extending parallel to the displacement direction and running through the center of the valve plate than the sealing ring at its farthest point from this axis.

7. The vacuum valve according to claim 1, wherein the at least one sliding-spacing part is arranged at the front of the valve plate and contacts the inner surface of the valve housing in the closed position of the valve plate.

8. The vacuum valve according to claim 7, wherein a projection is arranged at an inner surface of the valve housing in an area over which the sliding-spacing part moves before the closed position of the valve plate is reached, which projection is associated with this sliding-spacing part, in order to keep the valve plate at a distance from the valve seat, wherein the projection lies next to the sliding-spacing part in the closed position of the valve plate.

9. The vacuum valve according to claim 8, wherein the projection lies in a recess formed in the valve plate in the closed position of the valve plate.

10. The vacuum valve according to claim 1, wherein the at least one sliding-spacing part is arranged at the valve seat of the valve housing and contacts the front of the valve plate in the closed position of the valve plate.

11. The vacuum valve according to claim 10, wherein a projection is arranged at the front of the valve plate in an area over which the sliding-spacing part moves before the closed position is reached, which projection is associated with this sliding-spacing part, in order to keep the valve plate at a distance from the valve seat, wherein the projection lies next to the sliding-spacing part in the closed position of the valve plate.

12. The vacuum valve according to claim 11, wherein the projection of the valve plate lies in a recess of the valve seat in the closed position of the valve plate.

13. The vacuum valve according to claim 1, wherein the at least one sliding-spacing part is constructed as a separate part which is arranged in a recess formed in the front of the valve plate or valve seat.

14. The vacuum valve according to claim 13, wherein the at least one sliding-spacing part locks into the recess by means of a locking connection.

15. The vacuum valve according to claim 1, wherein the at least one sliding-spacing part has an outer surface with good sliding properties.

16. The vacuum valve according to claim 1, wherein the at least one sliding-spacing part is constructed so as to be inflexible in a direction perpendicular to the surface of the valve plate.

17. The vacuum valve according to claim 1, wherein the at least one sliding-spacing part is made of plastomer plastic.

18. The vacuum valve according to claim 1, wherein the vacuum valve has at least one sliding part which is arranged at a back of the valve plate remote of the valve seat or at a wall of the valve body located across from this back of the valve plate in the closed position of the valve plate and which forms a sliding bearing for the valve plate relative to the valve housing when closing the valve over a final section of the displacement path of the valve plate until its closed position is reached.

19. The vacuum valve according to claim 18, wherein there are at least two sliding parts which are at a distance from one another in circumferential direction of the valve plate and of an opening in the wall.

20. The vacuum valve according to claim 19, wherein the sliding parts have a length which is substantially shorter than the circumferential length of the sealing ring.

21. The vacuum valve according to claim 18, wherein the at least one sliding part is constructed as a separate part that is arranged in a recess formed in the back of the valve plate or in the wall of the valve housing.

22. The vacuum valve according to claim 21, wherein the sliding part locks into the recess by a locking connection.

23. The vacuum valve according to claim 18, wherein the at least one sliding part is made of plastomer plastic.

24. The vacuum valve according to claim 18, wherein the back of the valve plate is inclined relative to the displacement direction of the valve plate around an axis extending at right angles to the displacement direction and at right angles to the longitudinal axis of the valve opening.

25. The vacuum valve according to claim 1, wherein at least one roller is rotatably supported on the back of the valve plate and this at least one roller rolls on the valve housing when closing the valve over a final stretch of the displacement path of the valve plate before reaching its closed position.

26. The vacuum valve according to claim 1, wherein the valve housing has front and back walls having aligned openings which together form the valve opening, the valve plate being arranged in a chamber located between these two walls.

27. The vacuum valve according to claim 26, wherein the at least one valve rod is guided out of the chamber through a linear feed-through.

28. The vacuum valve according to claim 1, wherein the sealing ring is formed by an O-ring which is arranged in a circumferentially extending groove that is arranged in the front of the valve plate or in the valve seat.

29. The vacuum valve according to claim 28, wherein the sealing ring in its centered position seen in cross section is at a distance from the side walls of the groove along its entire course up to the base of the groove, wherein this distance increases toward the base of the groove proceeding from a minimum value at the outer defining edges of the groove or in the vicinity thereof.

30. The vacuum valve according to claim 1, wherein the inclination of the planes in which the sealing surface and the sealing ring are arranged relative to the displacement direction of the valve plate is in the range of 1° to 45°.

31. The vacuum valve according to claim 30, wherein this inclination is in the range of 4° to 10°.

* * * * *